United States Patent
Bothe et al.

(10) Patent No.: US 9,358,735 B2
(45) Date of Patent: Jun. 7, 2016

(54) METHOD OF TREATING A LENS FORMING SURFACE OF AT LEAST ONE MOLD HALF OF A MOLD FOR MOLDING OPHTHALMIC LENSES

(71) Applicant: Novartis AG, Basel (CH)

(72) Inventors: Harald Bothe, Wiesbaden (DE); Yasuo Matsuzawa, Roswell, GA (US)

(73) Assignee: NOVARTIS AG (CH)

( * ) Notice: Subject to any disclaimer, the term of this patent is extended or adjusted under 35 U.S.C. 154(b) by 509 days.

(21) Appl. No.: 13/684,790

(22) Filed: Nov. 26, 2012

(65) Prior Publication Data

US 2013/0147072 A1 Jun. 13, 2013

Related U.S. Application Data

(60) Provisional application No. 61/564,443, filed on Nov. 29, 2011.

(51) Int. Cl.
    *B29D 11/00* (2006.01)
    *B29C 33/72* (2006.01)

(52) U.S. Cl.
    CPC .......... *B29D 11/00038* (2013.01); *B29C 33/72* (2013.01); *B29D 11/00009* (2013.01); *B29D 11/0048* (2013.01); *B29D 11/00125* (2013.01); *B29C 2033/725* (2013.01)

(58) Field of Classification Search
    CPC .................. B29D 11/00038; B29D 11/00009; B29D 11/00125; B29D 11/0048; B29C 33/72; B29C 2033/725
    See application file for complete search history.

(56) References Cited

U.S. PATENT DOCUMENTS

| | | |
|---|---|---|
| 2,936,222 A | 5/1960 | Stevens |
| 3,008,920 A | 11/1961 | Urchick |
| 3,070,573 A | 12/1962 | Beck |
| 3,854,982 A | 12/1974 | Aelion |
| 4,032,440 A | 6/1977 | Yasuda |
| 4,137,550 A | 1/1979 | Kaganowicz |
| 4,159,292 A | 6/1979 | Neefe |
| 4,311,573 A | 1/1982 | Mayhan |

(Continued)

FOREIGN PATENT DOCUMENTS

| | | |
|---|---|---|
| CA | 2139019 A1 | 6/1995 |
| EP | 0367513 A2 | 5/1990 |

(Continued)

OTHER PUBLICATIONS

PCT International Search Report dated Mar. 14, 2013, International Application No. PCT/US2012/066510, International Filing Date Nov. 26, 2012.

(Continued)

*Primary Examiner* — Mathieu Vargot
(74) *Attorney, Agent, or Firm* — Sheng-Hsin Hu

(57) ABSTRACT

A method of treating a lens forming surface (2) of at least one mold half (1) of a mold for molding an ophthalmic lens, in particular of the lens forming surface of a glass mold half for molding a contact lens, especially a soft contact lens, includes the steps of:
  providing a plasma (10) under atmospheric pressure, and exposing the lens forming surface (2) to the plasma (10) under atmospheric pressure thereby hydrophilizing the lens forming surface (2) without depositing any material on the lens forming surface (2).

22 Claims, 1 Drawing Sheet

(56) References Cited

U.S. PATENT DOCUMENTS

| | | | |
|---|---|---|---|
| 4,312,575 A | 1/1982 | Peyman |
| 4,444,711 A | 4/1984 | Schad |
| 4,460,534 A | 7/1984 | Boehm |
| 4,468,229 A | 8/1984 | Su |
| 4,501,805 A | 2/1985 | Yasuda |
| 4,503,133 A | 3/1985 | van Lier |
| 4,534,916 A | 8/1985 | Wichterle |
| 4,553,975 A | 11/1985 | Su |
| 4,559,059 A | 12/1985 | Su |
| 4,568,501 A * | 2/1986 | Wichterle et al. ............... 264/2.1 |
| 4,589,964 A | 5/1986 | Mayhan |
| 4,632,844 A | 12/1986 | Yanagihara |
| 4,664,936 A | 5/1987 | Ueno |
| 4,692,347 A | 9/1987 | Yasuda |
| 4,749,457 A | 6/1988 | Yasuda |
| 4,752,426 A | 6/1988 | Cho |
| 4,761,436 A | 8/1988 | Kohno |
| 4,929,707 A | 5/1990 | Nagata |
| 4,946,923 A | 8/1990 | Nagata |
| 4,948,485 A | 8/1990 | Wallstén |
| 4,968,532 A | 11/1990 | Janssen |
| 4,980,196 A | 12/1990 | Yasuda |
| 4,994,298 A | 2/1991 | Yasuda |
| 5,013,496 A | 5/1991 | Nagata |
| 5,021,503 A | 6/1991 | Nagata |
| 5,126,388 A | 6/1992 | Nagata |
| 5,158,718 A | 10/1992 | Thakrar |
| 5,176,938 A | 1/1993 | Wallstén |
| 5,182,000 A | 1/1993 | Antonelli |
| 5,264,161 A | 11/1993 | Druskis |
| 5,267,390 A | 12/1993 | Yang |
| 5,270,082 A | 12/1993 | Lin |
| 5,278,384 A | 1/1994 | Matsuzawa |
| 5,312,529 A | 5/1994 | Antonelli |
| 5,508,317 A | 4/1996 | Müller |
| 5,542,978 A | 8/1996 | Kindt-Larsen |
| 5,583,163 A | 12/1996 | Müller |
| 5,594,088 A | 1/1997 | Nagata |
| 5,690,865 A | 11/1997 | Kindt-Larsen |
| 5,753,730 A | 5/1998 | Nagata |
| 5,789,334 A | 8/1998 | Nakanishi |
| 5,789,464 A | 8/1998 | Müller |
| 5,805,264 A | 9/1998 | Janssen |
| 5,843,346 A | 12/1998 | Morrill |
| 5,849,810 A | 12/1998 | Müller |
| 5,874,127 A | 2/1999 | Winterton |
| 5,894,002 A | 4/1999 | Boneberger |
| 6,281,468 B1 | 8/2001 | Souel |
| 6,551,531 B1 | 4/2003 | Ford |
| 6,627,124 B1 | 9/2003 | Herbrechtsmeier |
| 6,800,225 B1 | 10/2004 | Hagmann |
| 6,841,008 B1 | 1/2005 | Branco |
| 6,849,210 B2 | 2/2005 | Bothe |
| 6,858,248 B2 | 2/2005 | Qiu |
| 6,881,269 B2 | 4/2005 | Matsuzawa |
| 7,078,074 B2 | 7/2006 | Matsuzawa |
| 7,384,590 B2 | 6/2008 | Kelly |
| 7,387,759 B2 | 6/2008 | Kelly |
| 9,067,372 B2 | 6/2015 | Qiu |
| 2002/0064597 A1* | 5/2002 | Suzuki .................. A61L 12/06 351/159.74 |
| 2003/0163196 A1 | 8/2003 | Rothaug |
| 2012/0137635 A1 | 6/2012 | Qiu |
| 2012/0139137 A1 | 6/2012 | Qiu |

FOREIGN PATENT DOCUMENTS

| | | |
|---|---|---|
| EP | 0472303 A2 | 2/1992 |
| EP | 0604176 A1 | 12/1993 |
| EP | 0686469 | 12/1995 |
| EP | 0740997 | 11/1996 |
| EP | 1201253 A1 | 5/2002 |
| EP | 1245372 A2 | 10/2002 |
| EP | 1407866 al | 4/2004 |
| WO | 8704390 A1 | 7/1987 |
| WO | 9842497 | 10/1998 |
| WO | 0076738 A1 | 12/2000 |
| WO | 2004016405 A1 | 2/2004 |
| WO | 2009085902 | 7/2009 |
| WO | 2010071691 | 6/2010 |
| WO | 2010071691 A1 | 6/2010 |
| WO | 2012016097 | 2/2012 |

OTHER PUBLICATIONS

PCT Written Opinion of the International Searching Authority dated Mar. 14, 2013, International Application No. PCT/US2012/066510, International Filing Date Nov. 26, 2012.

Authors: H. Yasuda Name of Article: Glow Discharge Polymerization Published: Journal of Polymer Science: Macromolecular Reviews (1981) vol. 16, pp. 199-293.

Authors: N. Dilsiz and G Akovali Name of Article: Plasma Polymerization of Selected Organic Compounds Published: Polymer (1996) Vo. 37, No. 2, pp. 333-342.

* cited by examiner

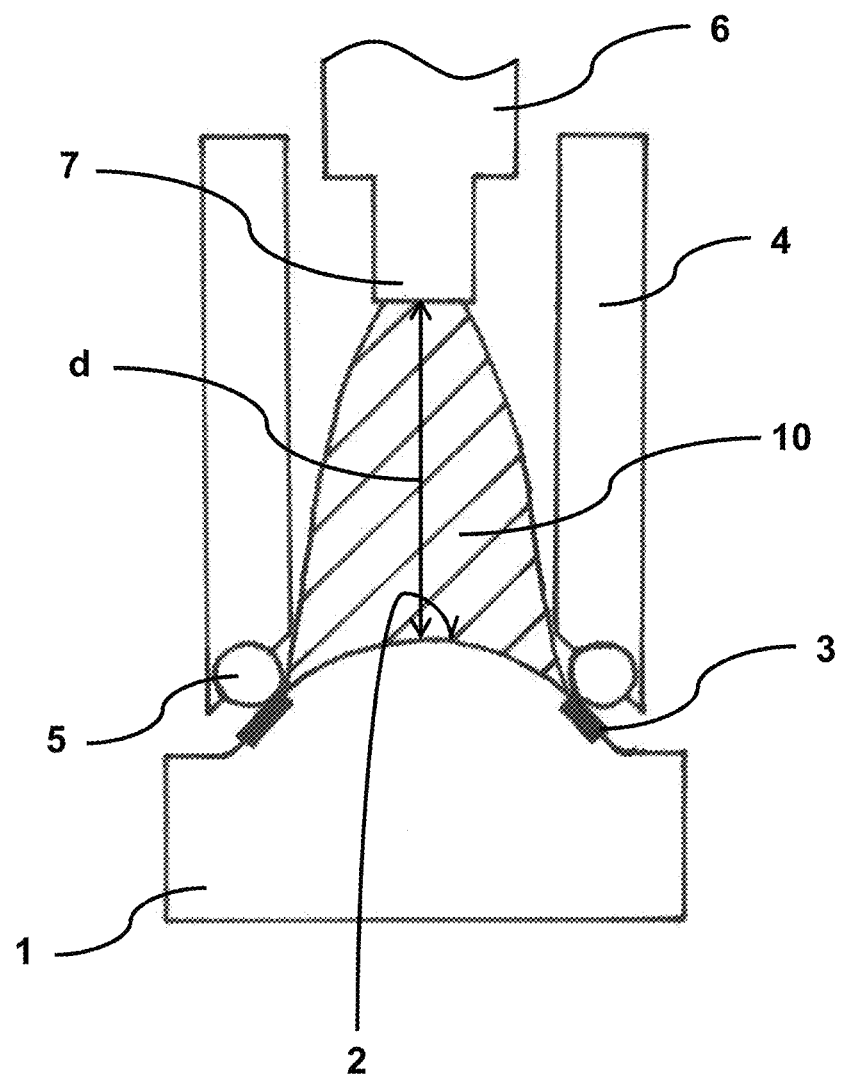

METHOD OF TREATING A LENS FORMING SURFACE OF AT LEAST ONE MOLD HALF OF A MOLD FOR MOLDING OPHTHALMIC LENSES

This application claims the benefit under 35 USC §119 (e) of U.S. provisional application Ser. No. 61/564,443 filed on Nov. 29, 2011, incorporated herein by reference in its entirety.

FIELD OF THE INVENTION

The present invention relates to a method of treating a lens forming surface of a least one mold half of a mold for molding an ophthalmic lens, in particular a contact lens, especially a soft contact lens.

BACKGROUND OF THE INVENTION

Mass production of ophthalmic lenses, in particular of contact lenses such as soft contact lenses, is usually performed in a fully automated process. Such process is described, for example, in WO 98/42497. In an embodiment of this fully automated process the contact lenses are manufactured with the aid of reusable molds comprising male and female mold halves. In a first processing station, a lens forming material is introduced into the female mold halves. A lens forming material known to be useful in such process is a prepolymer solution including prepolymers based on polyvinyl alcohols (PVA). The molds are then assembled in a subsequent processing station with the aid of corresponding male mold halves to form a mold cavity defining the shape of the contact lens to be formed. In a yet further subsequent processing station, the starting material within the mold cavity is polymerized and/or crosslinked by irradiation with ultraviolet radiation (UV-radiation) to form the soft contact lenses. Those portions of the lens forming material contained in the mold cavity which are not to be exposed to UV-radiation are shielded by a metal mask, which is arranged to surround the lens forming surface, so that the mask limits the space where the lens forming material enclosed between the male and female mold halves is exposed to UV-radiation. After exposure, the molds are opened and the so formed contact lenses are removed from the male or female mold halves, respectively, and are subsequently transported to further processing stations.

As has been outlined above, mass production of ophthalmic lenses includes the use of reusable molds or mold halves, respectively. The reusable molds or mold halves, or at least those parts thereof comprising the lens forming surfaces, are typically made from optically finished glass, for example from quartz glass. Such reusable molds are advantageous since they are transparent to UV-radiation, durable, can be easily cleaned after molding for subsequent re-use, etc. Therefore, they are particularly suitable for multiple use in mass production of ophthalmic lenses. However, depending on the lens forming material used, opening of the molds and subsequent removal of the contact lenses from the male or female mold half may turn out to be a task which is difficult to perform.

For example, when using lens forming materials for forming silicon hydrogel (SiHy) contact lenses, which are known to have excellent properties regarding oxygen permeability, wearing comfort, etc., considerably high forces are needed for opening the molds, that is to say for the separation of the male and female mold halves after the SiHy contact lens is formed by exposure to UV-radiation. Also, the adhesive forces between the lens forming surfaces and the formed SiHy contact lens may be very high. That is to say, even after opening of the molds the SiHy contact lens may strongly adhere to the lens forming surface of the male or female mold half, so that it is difficult to remove the contact lens from the mold half without damaging the lens (e.g. causing tears, starburst fractures, etc.). Accordingly, without further measures the result may be an increased number of damaged contact lenses which cannot be distributed to the consumers but must be disposed of. This may lead to an unacceptably high reject rate and may substantially affect the efficiency of the mass production process.

EP-0 686 469 and EP-0 740 997 suggest to apply a thin layer or film of a polymeric surfactant to an annular flange region extending about a mold surface of a plastic mold half. The thin layer of surfactant is supposed to facilitate removal of excess polymeric material (HEMA) which forms a ring extending externally of the mold cavity. With respect to SiHy contact lenses it has been suggested that the lens forming materials be provided with one or more mold release agents that should allow the more simple removal of the SiHy contact lens from the respective mold half, see WO 2009/085902. However, these mold release agents must be specifically adapted (tailored) to the respective lens forming material used to form the SiHy contact lens. In addition, even when using such mold release agents the above-mentioned problems related to the considerably high forces for separating the mold halves and related to the strong adhesive forces of the SiHy lens to the male or female mold half may continue to occur.

It is therefore and object of the present invention to provide a remedy to the afore-mentioned problems of the prior art. In particular, a method shall be provided which facilitates separation of the mold halves and/or removal of the ophthalmic lens from the respective lens molding surface of the mold half to which the molded ophthalmic lens adheres, even in cases where the ophthalmic lenses are made from lens forming materials such as SiHy materials or other materials, which tend to strongly adhere to the lens molding surfaces of reusable glass molds or mold halves. Preferably, the method shall be capable of being fully integrated in automated continuous mass production processes of ophthalmic lenses, in particular contact lenses and especially soft contact lenses made from such materials.

SUMMARY OF THE INVENTION

In order to overcome the afore-mentioned disadvantages, the present invention suggests a method of treating a lens forming surface of at least one mold half of a mold for molding an ophthalmic lens, in particular of the lens forming surface of a glass mold half for molding a contact lens, especially a soft contact lens. The method includes the steps of:
  providing a plasma under atmospheric pressure, and
  exposing the lens forming surface to the plasma under atmospheric pressure thereby hydrophilizing the lens forming surface without depositing any material on the lens forming surface.

By providing the plasma under atmospheric pressure and exposing the lens forming surface to the plasma under atmospheric pressure thereby hydrophilizing the exposed lens forming surface without depositing any material on the lens forming surface, surprisingly adhesion of the ophthalmic lens to the treated lens forming surface is at least very substantially reduced. Thus, ophthalmic lenses, and in particular SiHy contact lenses, may be produced which after demolding are free from any defects such as tears or starburst fractures. This is particularly surprising because it could not be expected that hydrophilization of a lens forming surface would result in a reduction of adhesive forces between such treated lens forming surface and SiHy contact lenses. Rather, one would have expected that the opposite treatment, namely a treatment of a lens forming surface rendering it more hydrophobic would result in the reduction of adhesive forces.

Due to the plasma treatment being accomplished under atmospheric pressure, it is capable of easily getting integrated into a mass production process for the manufacture of ophthalmic lenses, in particular into a mass production process for the manufacture of SiHy contact lenses. In particular, the method is advantageous in connection with reusable glass molds or mold halves, especially in connection with molds made of quartz glass.

In one embodiment of the method according to the invention, the mold comprises a male mold half and a female mold half, and the lens forming surfaces of the male mold half and of the female mold half are both exposed to the plasma. This embodiment is advantageous in that it facilitates removal of the lens from the respective mold half regardless of whether the lens adheres to the male mold half or to the female mold half.

In a further embodiment of the method according to the invention, the lens forming surfaces of the male mold half and of the female mold half are exposed to the plasma for different periods of time. This embodiment allows to preferably make the lens adhere to one of the two mold halves, for example to the male mold half, while at the same time maintaining the advantages of an easy demolding of the lens.

Alternatively, in accordance with another embodiment of the method according to the invention, the mold comprises a male mold half and a female mold half, and the lens forming surface of only one of the male and female mold halves is exposed to the plasma. This embodiment is also advantageous in that it makes the lens adhere to a predetermined one of the male and female mold halves (to that mold half not exposed to the plasma).

In particular in a fully automated continuous process for the mass production of contact lenses, this may be advantageous in that a step of transferring the lens from the male mold half to the female mold half or vice versa can be omitted due to the lens adhering to the predetermined (untreated) mold half. For example, upon treatment of only the female mold half the contact lenses, upon opening of the molds and subsequent demolding of the lenses, are all adhering only to the male mold half (~100%), whereas without treatment of any of the two mold halves said proportion is usually only at about 90% or less. The effort of collecting lenses from both mold halves without knowing to which mold half the lens actually adheres can thus be significantly reduced by the above described two preceding embodiments of the method according to the invention.

In accordance with a further embodiment of the method according to the invention, the plasma is a plasma of a gas selected from the group consisting of argon (Ar), helium (He), nitrogen ($N_2$), oxygen ($O_2$), tetrafluoroethane ($C_2H_2F_4$), air or a mixture of argon and oxygen (Ar/$O_2$), Ar/$N_2$, Ar/air, Ar/$C_2H_2F_4$, He/$O_2$, He/$N_2$, He/air, He/$C_2H_2F_4$, $N_2$/$O_2$. Those gases or mixtures of gases, respectively, are easy in handling and do not require specific retaining measures nor special treatment ovens or the like additional equipment.

Particularly suitable gases for the plasma used in the method according to the invention are argon (Ar) or a mixture of argon (Ar) and oxygen ($O_2$).

In accordance with a further method according to the invention, the lens forming surface is exposed to the plasma such that the water contact angle of the treated lens forming surface is smaller than 40°, preferably smaller than 20° and more preferably smaller than 10°. The water contact angle is an indicator of the hydrophilicity of the treated lens forming surface. It may be measured using a conventional contact angle goniometer. In a preferred embodiment of the invention the lens forming surface is exposed to the plasma such that the water contact angle is smaller than 30°. Even more preferably, the lens forming surface is exposed to the plasma such, that the water contact angle is smaller than 10°.

In accordance with a further embodiment of the method according to the invention, the lens forming surface is exposed to the plasma for a time period not exceeding 20 seconds, preferably for a time period in the range of 0.1 to 20 seconds, and more preferably for a time period in the range of 1 to 20 seconds, in particular from 10 to 20 seconds. It is to be noted that the exposure time inter alia is dependent on the energy, the propagation rate and the geometry of the plasma.

The exposure time has a direct influence on the reduction of the adhesive forces occurring upon opening the lens molds and upon demolding of the ophthalmic lens. While a very considerable reduction of the adhesive forces can be obtained already with exposure times of equal to or longer than 5 seconds, exposure times of equal to or longer than 10 seconds are preferred. However, while exposure times exceeding 20 seconds are also believed suitable, they do not appear to be practicable, in particular with respect to a possible integration of the plasma exposure into an automatic mass production process, in which the lens forming surfaces of one or both mold halves are exposed to plasma each time before a lens is produced.

In accordance with a further method according to the invention, the plasma is generated with the aid of a plasma torch comprising a plasma gun and a tubular plasma concentrator. The plasma concentrator sealingly (and non-conductively) surrounds the space between the plasma gun and the lens forming surface of the mold or mold half. Thus, the plasma is limited to the space surrounded by the plasma concentrator and the exposure can be limited to the lens forming surface. This constitutes a practical approach how the exposure of the lens forming surface of a mold half to plasma can be performed.

In particular, in accordance with a further embodiment of the method according to the invention, the mold half exposed to plasma is a male mold half which is provided with an annular mask made from metal, and this annular mask is arranged to surround the lens forming surface of the male mold half. The annular mask is shielded from exposure to the plasma by the plasma concentrator. The shielding of the annular mask prevents the mask from being negatively impacted by the plasma and in particular also prevents spark-over to occur (ion discharge).

As has already been mentioned, the method is particularly advantageous in connection with a method of molding an ophthalmic lens, in particular a contact lens, especially a soft contact lens. Accordingly, another aspect of the invention is directed to such method for molding. This method comprises the steps of providing a mold comprising a male mold half and a female mold half, each of the male and female mold halves having a lens forming surface, introducing a lens forming material into male mold half or the female mold half, assembling the male and female mold halves, exposing the lens forming material arranged between the lens forming surfaces of the male and female mold halves to polymerizing and/or crosslinking energy to form the lens, disassembling the male and female mold halves to open the mold, and removing the lens from the male mold half or from the female mold half.

The lens forming surface either of both the male and female mold halves or of only one of the male and female mold halves is treated by a method as it has been described in the various embodiments above, prior to introducing the lens forming material into the male mold half or the female mold half. The advantages of such method for molding an ophthalmic lens have already been discussed above.

In one embodiment of the method for molding according to the invention, the mold halves are reusable and are reused to mold a plurality of ophthalmic lenses, and wherein the lens forming surface(s) of one of the mold halves or of both mold halves is exposed to the plasma again after molding a predetermined number of ophthalmic lenses. In this embodiment, the lens forming surfaces of one of the mold halves or of both mold halves are exposed to the plasma once and subsequently a predetermined number of lenses is produced.

In another embodiment of the method of molding according to the invention, the mold halves are reusable mold halves which are reused to mold a plurality of ophthalmic lenses, and wherein the lens forming surface(s) of one of the mold halves or of both mold halves is exposed to the plasma prior to molding of each ophthalmic lens. This embodiment is particularly advantageous in that the freshly treated lens forming surface is obtained each time before an ophthalmic lens is produced. Accordingly, this embodiment of the method allows for an easy integration in a fully automated production line for the mass manufacture of SiHy contact lenses in form of a plasma treatment station. Each time a contact lens has been produced and removed from the male mold half or the female mold half, the mold halves are cleaned and dried, and then the male and female mold halves arrive at the plasma treatment station, where the lens forming surface of one or both mold halves is/are exposed to the plasma before the next contact lens is produced using these mold halves.

As has already been discussed, while the method is generally advantageous for any type of material that strongly adheres to the lens forming surface, it is particularly advantageous for the production of a silicon hydrogel ophthalmic lens, in particular a silicon hydrogel soft contact lens.

It goes without saying, that in fully automated production lines for the mass production of ophthalmic lenses, in particular soft contact lenses, a plurality of molds or mold halves may be arranged in side by side configuration, in order to simultaneously manufacture a greater number of lenses. For an effective production, the lens forming surfaces of this plurality of molds or mold halves can be simultaneous exposed to a respective plasma.

BRIEF DESCRIPTION OF THE DRAWINGS

These and still further features and advantages of the invention will become apparent from the following description of an exemplary embodiment of the invention, reference being made to the schematic drawings which are not to scale, in which:

FIG. 1 shows an exemplary embodiment of an apparatus for carrying out the method according to the invention.

DETAILED DESCRIPTION

The following description of an exemplary embodiment of the invention is for illustrative purposes only and is not intended to limit the scope of the invention.

FIG. 1 shows a male mold half 1 the convex lens forming surface 2 of which is exposed to an atmospheric plasma 10 in accordance with the method of the instant invention. Male mold half 1 is made of glass, preferably of quartz glass, and is provided with an annular mask 3 which is arranged to surround the lens forming surface 2. For example, mask 3 can be made from chromium or from any other suitable metal. A tubular plasma concentrator 4 is sealingly arranged on lens forming surface 2. A sealing gasket 5 is arranged to contact lens forming surface 2 such that the innermost borders of mask 3 are arranged radially outwardly of a contact region formed between sealing gasket 5 and lens forming surface 2. A plasma gun 6 is arranged generally above plasma concentrator 4. Plasma gun 6 has a plasma gas nozzle 7 that extends into plasma concentrator 4. Plasma gas nozzle 7 is provided with an orifice having a diameter of about 3 millimeters (mm), for example. In operation, the orifice of plasma gas nozzle 7 is arranged above an apex of lens forming surface 2 at a distance d not exceeding 30 mm but not smaller than 15 mm. Prior to exposure of lens forming surface 2 to the atmospheric plasma 10, the space within plasma concentrator 4 is flushed with a gas corresponding to that of the plasma. The flushing time may, for example amount from about 15 seconds to about 30 seconds.

FIG. 1 schematically shows the state when lens forming surface 2 is exposed to plasma 10 under atmospheric pressure. Sealing gasket 5, which is made of an electrically non-conductive material (as is plasma concentrator 4), delimits the radial extension of the plasma 10 and prevents mask 3 from being impacted by plasma 10. By means of the plasma treatment lens forming surface 2 is hydrophilized such that that after exposure the water contact angle is smaller than 40°. The water contact angle is an indicator of the hydrophilicity of the treated lens forming surface 2, and may be measured using a conventional contact angle goniometer. In a preferred embodiment of the method according to the invention the lens forming surface 2 is exposed to the atmospheric plasma 10 such, that after exposure the water contact angle of the treated lens forming surface is smaller than 20°. Even more preferably, lens forming surface 2 is exposed to the atmospheric plasma 10 such, that the water contact angle of the treated lens forming surface is smaller than 10°.

An automated continuous mass production processes for contact lenses, in particular for soft contact lenses made of SiHy material, into which the method of the invention can readily be integrated, is for example described in WO 2010/071691 from page 21, line 30 to page 23, line 3, as well as from page 5, line 35 to page 6, line 26, which is herein incorporated by reference.

EXAMPLES

In the following examples reusable molds are used comprising a female mold half made of glass (B-270, available from Schott, Germany) and a male mold half made of quartz glass (Lithosil-SQ1, available from Schott, Germany).

These molds are typically used in an automated continuous mass production process for manufacturing ophthalmic lenses, in particular for manufacturing soft contact lenses. Such a process is for example described in WO 2010/071691 from page 21, line 30 to page 23, line 3, as well as from page 5, line 35 to page 6, line 26, which is herein incorporated by reference. After each production cycle in a laboratory set up of said automated continuous manufacturing process, the mold halves are manually cleaned with a cleaning sponge soaked with 2-Propanol. After cleaning with the cleaning sponge the mold halves are rinsed with water and dried with pressurized air. After drying the concave lens forming surface on the female mold half and/or the convex lens forming surface on the male mold half, the respective mold halves are treated by exposure to a plasma under atmospheric pressure as shown in the table below.

The atmospheric plasma is generated by a Plasma Treatment System PT-2000P, available from Tri-Star Technologies, El Segundo, Ca, U.S.A. having a maximum internal plasma potential of 30 kV, a fundamental plasma frequency of 20 kHz and a typical power consumption of 50 W. The atmospheric plasma is generated with either Argon (Ar) being the plasma gas at a flow rate of 850 l/h or with an Argon/Oxygen mixture (Ar/$O_2$) being the plasma gas at a flow rate of 850 l/h (Ar) and 1.7 l/h ($O_2$) or with an Argon/Tetrafluoroethane mixture (Ar/$C_2H_2F_4$) being the plasma gas at a flow rate of 850 l/h (Ar) and 34 l/h ($C_2H_2F_4$).

A tubular plasma concentrator is placed concentrically on the lens forming surface. The plasma concentrator is made from an electrically non-conductive material (e.g. Polymethylmethacrylate PMMA), and prohibits arching to a metal sleeve accommodating the female mold half. The plasma gun of the Plasma Treatment System is placed over the tubular plasma concentrator such that its plasma gas nozzle is arranged at a distance of about 16 mm from the lowermost point of the concave lens forming surface. The plasma gas nozzle has an orifice of a diameter of 3 mm.

Before each plasma treatment the space inside the tubular plasma concentrator is flushed with the plasma gas for 20 seconds. The actual exposure time to the atmospheric plasma is given for each example in the table below.

As a direct indicator for the hydrophilicity achieved by the plasma treatment of the lens forming surface, the water contact angle is determined on glass slides after exposure to the same plasma for the same time period. The water contact angle (WCA) is determined using a conventional contact angle goniometer. A useful procedure for WCA measurement is for example described in WO 2010/071691 on page 25, lines 1-10, which is herein incorporated by reference.

For comparative purposes, a set of molds (cleaned and dried as described above) is coated with Aculon®, i.e. a highly hydrophobic coating commercially available from Aculon, Inc., 11839 Sorrento Valley Road, San Diego, Calif. 92121 (USA), which is provided to the lens forming surfaces of either the male mold half, or the female mold half or both the male and the female mold halves.

The molds with the plasma treated lens forming surfaces of the respective mold halves, as well as the set of mold halves coated with Aculon®, are used for the production of silicon hydrogel (SiHy) contact lenses as described below.

The synthesis of the lens forming material (lens formulation) as well as the subsequent preparation of the SiHy contact lenses is generally described in example 10 on pages 54 and 55 of the International patent application with filing number WO 2012/016097, which is herein incorporated by reference.

For the present examples said lens formulation is modified in that the component "Brij 52" (at 1% by weight) is replaced by additional 1-PrOH, i.e. the lens formulation then has the following composition: 71% by weight of prepolymer F2; 4% by weight of DMA; 1% by weight of TPO; 1% by weight of DMPC; and 23% by weight of 1-PrOH.

The lens forming material is introduced into the female mold halves and the molds are assembled using the corresponding male mold halves. UV crosslinking is then performed with a UV lamp (e.g. a Hamamatsu UV lamp manufactured by Hamamatsu K.K.) equipped with a 380 nm cut-off filter at an irradiation dose of 130 mJ/$cm^2$, i.e. corresponding to an irradiation time of 26 seconds at an intensity of 5 mW/$cm^2$.

The mold halves are separated by a Zwick tensile test machine at an opening speed of 50 mm/min for a determination of the Mold Separation Force (MSF). The Mold Separation Force (MSF) is the force which is needed to open the two mold halves (male and female mold halves) after formation of the contact lens. The MSF is measured by a tensile testing machine (Zwick 2.5). For that purpose, one mold-half is rigidly fixed and the other mold half is fixed in a double cardanic mounting to enable force-free alignment. The Relative Mold Separation Force is the ratio of the MSF for lenses produced with mold halves having lens forming surfaces which are exposed to a plasma treatment under atmospheric pressure (or an Aculon® coating), and the MSF needed for control lenses produced with mold halves without plasma treatment and without an Aculon® coating.

After opening the molds, the formed contact lenses are manually loosened from the mold halves, extracted, and coated with PAA (polyacrylic acid), packed with PBS (phosphate buffered saline) solution in polypropylene blister packages, sealed, autoclaved and inspected for lens defects. More specifically, the lenses are inspected for "starburst fractures", which are star shaped outbursts of the lens material, typically with a diameter of about 25 µm or more. The lens defect rate of "starburst fractures" is directly related to the adhesive forces of the lenses to the lens forming surfaces of the mold halves. The defects are determined by manual inspection using an Optispec instrument at a 13-fold magnification. The defect rate in % is determined as the ratio of the number of lenses having starburst fractures multiplied by 100 and divided by the total number of inspected lenses.

The results of the Examples are listed in the following table. For each Example the number of lenses prepared and tested is n≥6.

| Example | Plasma Gas/ Gases | Treated/ Coated Mold Halves[2] | | Plasma Treatment Time [s] | WCA[1] [°] | Relative MSF [%] | Starburst Fractures [%] |
|---|---|---|---|---|---|---|---|
| | | Female | Male | | | | |
| 1a | Ar | + | − | 20 | n.d.[3] | 31 | 0 |
| 1b | Ar | − | + | 20 | <10 | 61 | n.d.[3] |
| 1c | Ar | + | + | 20 | <10° | 35 | 0 |
| 2a | Ar/$O_2$ | + | − | 20 | n.d.[3] | 20 | 0 |
| 2b | Ar/$O_2$ | − | + | 20 | <10° | 45 | n.d.[3] |
| 2c | Ar/$O_2$ | + | + | 20 | <10° | 29 | 20 |
| 3a | $C_2H_2F_4$ | + | − | 10 | n.d.[3] | 62 | 33 |
| 3b | $C_2H_2F_4$ | − | + | 10 | <10° | 73 | 100 |
| 3c | $C_2H_2F_4$ | + | + | 10 | <10° | 55 | 70 |

-continued

| Example | Plasma Gas/ Gases | Treated/ Coated Mold Halves[2] Female | Treated/ Coated Mold Halves[2] Male | Plasma Treatment Time [s] | WCA[1] [°] | Relative MSF [%] | Starburst Fractures [%] |
|---|---|---|---|---|---|---|---|
| 4a | Aculon | + | − | | n.d.[3] | 101 | 100 |
| 4b | Aculon | − | + | | 99 | 107 | 100 |
| 4c | Aculon | + | + | | 101 | 110 | 100 |
| 5 | w/o control | | | | 60 (17)[4] | 100 | 100 |

[1] Measured on apex of male mold;
[2] +: treated, −: untreated;
[3] n.d.: not determined;
[4] Standard Deviation As can be seen from the results, due to the exposure of one or both lens forming surfaces to atmospheric plasma of Argon (Ar) or a mixture of Argon and Oxygen (Ar/O$_2$) as plasma gases, the Mold Separation Forces (MSF) are drastically reduced.

For Tetrafluoroethane as the plasma gas, the MSF is reduced as well, but generally the effect is less pronounced.

At the same time, the plasma treatment in particular with an atmospheric plasma of Argon (Ar) or a mixture of Argon and Oxygen (Ar/O$_2$) as plasma gases, reduces the lens defects of the "starburst fractures" type to zero (or close to zero).

On the other hand, Aculon® coating, i.e. a highly hydrophobic coating, has no advantageous effect, neither regarding the MSF nor regarding the "starburst fractures".

Further examples (which are not represented in the table) for atmospheric plasma of Argon or a mixture of Ar/O$_2$ as plasma gases, with exposure to the plasma torch of only 10 seconds (and of only 5 seconds) also show a clear reduction in both, MSF and starburst fractures.

The invention has been explained with the aid of FIG. 1 by an exemplary plasma treatment of the convex lens forming surface of a male mold half. It is to be noted though, that the plasma treatment can alternatively be applied to the concave lens forming surface of the female mold half, as outlined in the examples. When the treatment method according to the invention is applied to the lens forming surface of the female mold half, prior to the exposure of the lens forming surface to the plasma, a tubular plasma concentrator is placed sealingly and concentrically on the lens forming surface, and a plasma gun is placed over said tubular plasma concentrator. The plasma gun has a plasma gas nozzle having an orifice which is arranged from a lowermost point of the concave lens forming surface at a distance not exceeding 30 mm but not smaller than 15 mm. Prior to the exposure of the lens forming surface on the female mold half to the plasma torch the space within the tubular plasma concentrator is flushed with a gas corresponding to the gas of the atmospheric plasma.

In a still further embodiment of the invention the plasma treatment may be applied to the lens forming surfaces on both, the male and the female mold half, respectively. By varying the treatment time the hydrophilicity of the treated lens forming surfaces can be controlled. Thus, e.g. by exposing the lens forming surface on the female mold half for a shorter time period than the plasma treatment of the lens forming surface on the male mold half or by plasma treatment of the lens forming surface on the male mold half only, it can be ascertained that after polymerization or crosslinking and after opening of the mold halves the formed ophthalmic lens remains attached to the lens forming surface on the female mold half, so that a step of transferring the lens from the male mold half to the female mold half can be omitted. From the female mold half the ophthalmic lens can be removed e.g. by water flushing or with a suitable gripper, as this is well-known in the art.

The invention claimed is:

1. Method of molding a silicon hydrogel soft contact lens, the method comprising the steps of providing a mold comprising a male mold half and a female mold half, each of the male and female mold halves having a lens forming surface, introducing a silicon hydrogel lens forming material into the male mold half or the female mold half, assembling the male and female mold halves, exposing the lens forming material arranged between the lens forming surfaces of the male and female mold halves to polymerizing and/or crosslinking energy to form the silicon hydrogel soft contact lens, disassembling the male and female mold halves to open the mold, and removing the silicon hydrogel soft contact lens from the male mold half or from the female mold half,
   wherein the lens forming surface of either both the male and female mold halves or of only one of the male and female mold halves is treated by a plasma treatment prior to introducing the lens forming material into the male mold half or the female mold half,
   wherein the plasma is generated with the aid of a plasma torch comprising a plasma gun and a tubular plasma concentrator, the plasma concentrator sealingly surrounding the space between the plasma gun and the lens forming surface of the mold or mold half, wherein the plasma treatment is under atmospheric pressure thereby hydrophilizing the lens forming surface without depositing any material on the lens forming surface.

2. Method according to claim 1, wherein the mold halves are reusable and are reused to mold a plurality of silicon hydrogel soft contact lenses, and wherein the lens forming surface(s) of one of the mold halves or of both mold halves is exposed to the plasma again after molding a predetermined number of ophthalmic lenses.

3. Method according to claim 1, wherein the mold halves are reusable mold halves which are reused to mold a plurality of silicon hydrogel soft contact lenses, and wherein the lens forming surface(s) of one of the mold halves or of both mold halves is exposed to the plasma prior to molding of each silicon hydrogel soft contact lens.

4. Method according to claim 1, wherein the lens forming surfaces of both the male mold half and the female mold half are exposed to the plasma treatment.

5. Method according to claim 2, wherein the lens forming surfaces of the male mold half and of the female mold half are exposed to the plasma for different periods of time.

6. Method according to claim 1, wherein only one of the lens forming surfaces of the male mold half and the female mold half are exposed to the plasma treatment.

7. Method according to claim 6, wherein only the lens forming surfaces of the female mold half are exposed to the plasma treatment.

8. Method according to claim 1, wherein the plasma is a plasma of a gas selected from the group consisting of argon, helium, nitrogen, oxygen, tetrafluoroethane, air, or a mixture of argon and oxygen, argon and nitrogen, argon and air, argon and tetrafluoroethane, helium and oxygen, helium and nitrogen, helium and air, helium and tetrafluoroethane, nitrogen and oxygen.

9. Method according to claim 1, wherein the plasma is a plasma of argon or a plasma of a mixture of argon and oxygen.

10. Method according to claim 1, wherein the lens forming surface is exposed to the plasma such that the water contact angle of the treated lens forming surface is smaller than 40°.

11. Method according to claim 1, wherein the lens forming surface is exposed to the plasma for a time period not exceeding 20 seconds.

12. Method according to claim 6, wherein the mold half exposed to plasma is a male mold half which is provided with an annular mask made from metal, the annular mask being arranged to surround the lens forming surface of the male mold half, and wherein the annular mask is shielded from exposure to the plasma by the plasma concentrator.

13. Method of treating of a lens forming surface of at least one mold half of a mold for molding an ophthalmic lens, the method including the steps of:
providing a plasma under atmospheric pressure, and
exposing the lens forming surface to the plasma under atmospheric pressure thereby hydrophilizing the lens forming surface without depositing any material on the lens forming surface, wherein the plasma is generated with the aid of a plasma torch comprising a plasma gun and a tubular plasma concentrator, the plasma concentrator sealingly surrounding the space between the plasma gun and the lens forming surface of the mold or mold half.

14. Method according to claim 13, wherein the mold comprises a male mold half and a female mold half, and wherein the lens forming surfaces of both the male mold half and the female mold half are exposed to the plasma.

15. Method according to claim 14, wherein the lens forming surfaces of the male mold half and of the female mold half are exposed to the plasma for different periods of time.

16. Method according to claim 13, wherein the mold comprises a male mold half and a female mold half, and wherein the lens forming surface of only one of the male and female mold halves is exposed to the plasma.

17. Method according to claim 16, wherein the lens forming surface of only the female mold half is exposed to the plasma.

18. Method according to claim 13, wherein the plasma is a plasma of a gas selected from the group consisting of argon, helium, nitrogen, oxygen, tetrafluoroethane, air, or a mixture of argon and oxygen, argon and nitrogen, argon and air, argon and tetrafluoroethane, helium and oxygen, helium and nitrogen, helium and air, helium and tetrafluoroethane, nitrogen and oxygen.

19. Method according to claim 13, wherein the plasma is a plasma of argon or a plasma of a mixture of argon and oxygen.

20. Method according to claim 13, wherein the lens forming surface is exposed to the plasma such that the water contact angle of the treated lens forming surface is smaller than 40°.

21. Method according to claim 13, wherein the lens forming surface is exposed to the plasma for a time period not exceeding 20 seconds, preferably for a time period in the range of 5 to 20 seconds.

22. Method according to claim 13, wherein the mold half exposed to plasma is a male mold half which is provided with an annular mask made from metal, the annular mask being arranged to surround the lens forming surface of the male mold half, and wherein the annular mask is shielded from exposure to the plasma by the plasma concentrator.

* * * * *